United States Patent [19]
Colvin

[11] Patent Number: 6,056,486
[45] Date of Patent: May 2, 2000

[54] CUTTING TOOL POINT

[76] Inventor: Kevin F. Colvin, 37 Lehigh Ct., Depew, N.Y. 14043

[21] Appl. No.: 09/115,866

[22] Filed: Jul. 15, 1998

[51] Int. Cl.[7] .................................................... B23B 51/02
[52] U.S. Cl. ................................ 408/59; 407/11; 408/230
[58] Field of Search .............................. 408/59, 230, 227, 408/229; 407/11

[56] References Cited

U.S. PATENT DOCUMENTS

| | | | |
|---|---|---|---|
| 750,537 | 1/1904 | Hanson | 408/230 |
| 1,467,491 | 9/1923 | Oliver | 408/230 |
| 2,322,894 | 6/1943 | Stevens | 408/230 |
| 2,769,355 | 11/1956 | Crisp | 408/230 |
| 2,778,252 | 1/1957 | Oxford, Jr. | 408/230 |
| 2,966,081 | 12/1960 | Kallio | 408/230 |
| 4,529,341 | 7/1985 | Greene | 408/212 |
| 4,728,231 | 3/1988 | Kunimori et al. | 408/59 |
| 5,011,342 | 4/1991 | Hsu | 408/230 |
| 5,160,232 | 11/1992 | Maier | 408/223 |
| 5,486,075 | 1/1996 | Nakamura et al. | 408/230 |
| 5,590,987 | 1/1997 | Bouzounie | 408/230 |
| 5,829,926 | 11/1998 | Kamermeier | 408/59 |

FOREIGN PATENT DOCUMENTS

| | | | |
|---|---|---|---|
| 3336018 | 4/1985 | Germany | 408/230 |
| 406206110 | 7/1994 | Japan | 408/230 |

*Primary Examiner*—Daniel W. Howell
*Attorney, Agent, or Firm*—Phillips, Lytle, Hitchcock, Blaine & Huber LLP

[57] ABSTRACT

The invention is directed to an improved cutting tool point. In the preferred embodiment, the cutting tool is comprised of a marginal end portion (15), adapted to selectively removed material from a work piece when the tool is moved relative to the work piece and having a leading cutting lip (16), a trailing dam (18), a recessed surface (19) extending into the marginal end portion between the cutting lip and the dam, and a coolant hole (20) communicating with the recessed surface, such that the recessed surface forms a reservoir (40) for coolant (36). The present invention also discloses a marginal end portion having an axis of rotation (42), at least one flute (21), and at least one chip-forming notch (31) extending from the flute into the marginal end portion and beyond the axis of rotation. The present invention also discloses a marginal end portion having a chip former (37) and a chip breaker (32). The present invention also discloses a marginal end portion having a land (22) composed of an upper portion (33) and a lower portion (34), the upper portion having a land recess (35) to accommodate coolant and to provide a fluid bearing between said upper portion and said work piece.

3 Claims, 4 Drawing Sheets

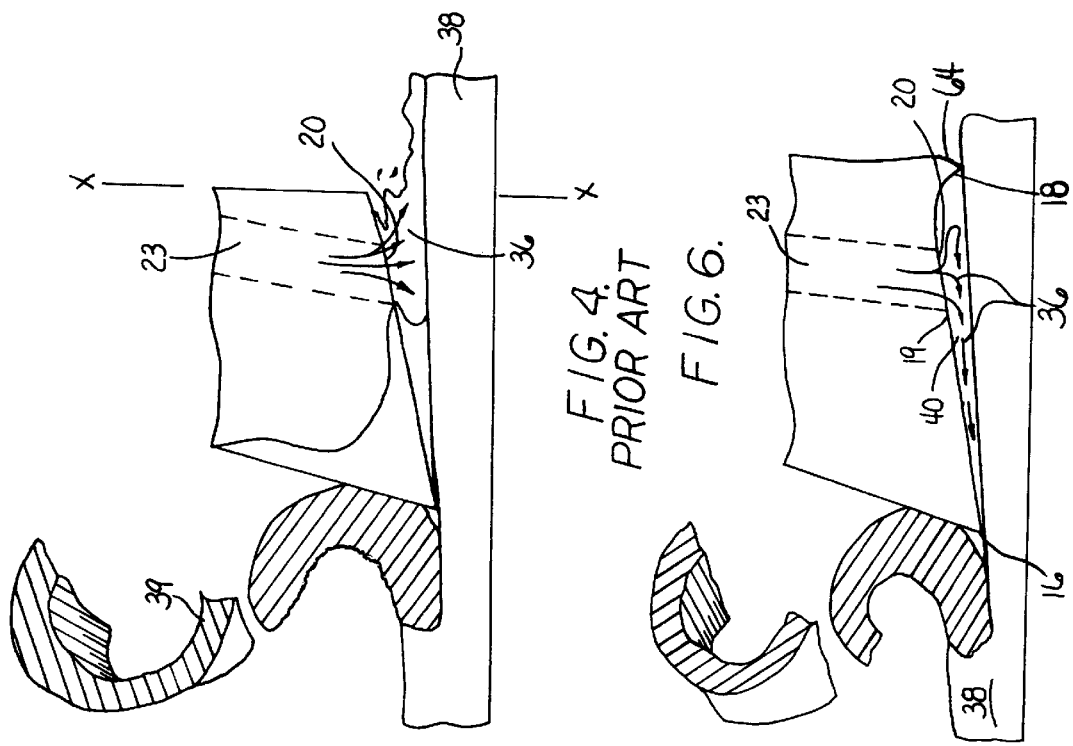
FIG. 4. PRIOR ART
FIG. 6.
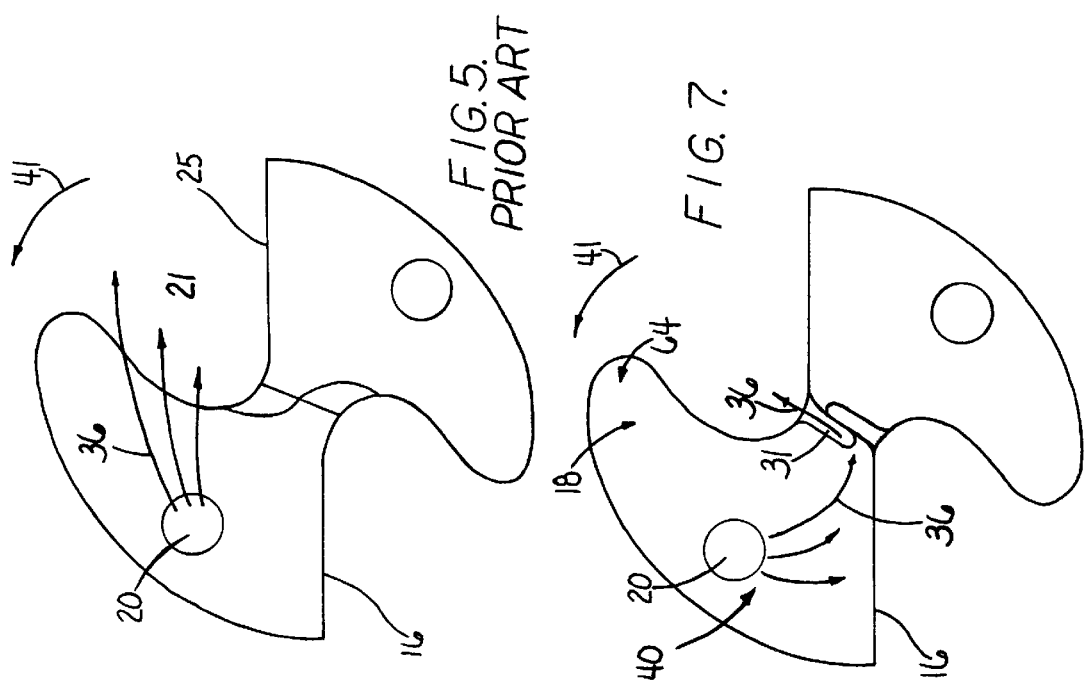
FIG. 5. PRIOR ART
FIG. 7.

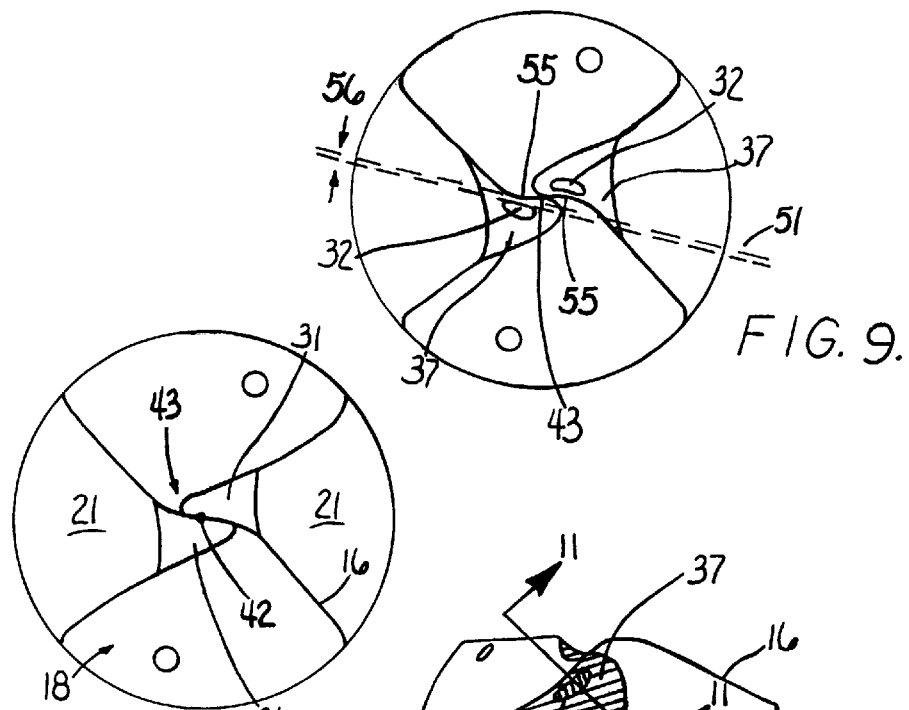
FIG. 9.
FIG. 8.
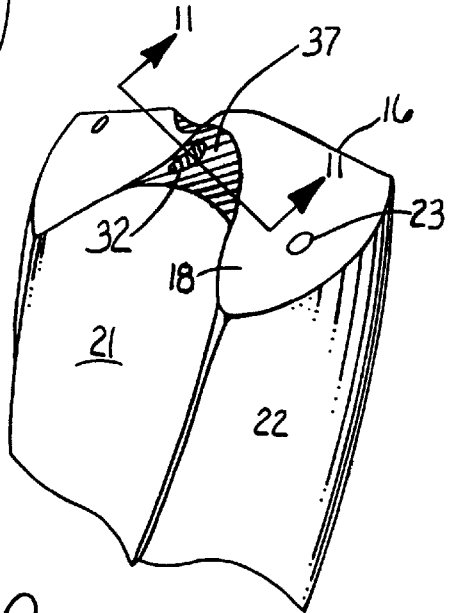
FIG. 10.
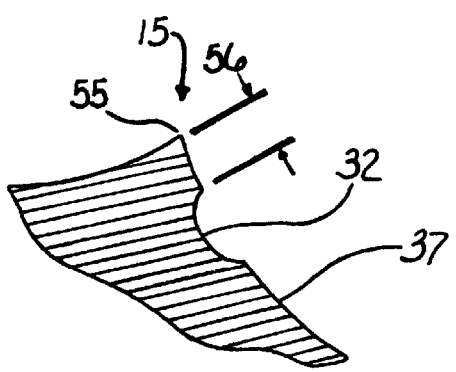
FIG. 11.

CUTTING TOOL POINT

FIELD OF THE INVENTION

The present invention relates generally to the field of cutting tools and, more particularly, to a cutting tool point with a unique topography.

BACKGROUND ART

A variety of cutting tool points have been used in the past to cut materials, and a variety of drill point configurations and styles are known in the prior art. Many forces are present during a cutting tool's penetration of a work piece which affect the durability of a cutting tool. One of the most damaging forces to the cutting tool's structural integrity is frictional contact between the cutting surface and the work piece. It is known in the prior art that a coolant can be introduced into the drill hole to reduce such friction and to dissipate heat. Typically, the coolant or fluid is fed through a channel which extends the length of the cutting tool and exits at the cutting tool's point. In this way, cooling and lubricating fluid can be introduced at the cutting action regardless of the depth of the hole. As the cutting fluid is pumped in, chips and coolant are forced out of the hole while the drill is taken to depth. The coolant fluid hole can help assure that cutting fluid reaches the true depth of the hole, can keep the tool cooler at the point of cutting action, and can help assist with chip evacuation through the flutes of the drill.

However, upon information and belief, the prior art has not maximized the friction-reducing, heat-reducing, and evacuation-assisting possibilities of introduced coolant. In particular, the prior art is not believed to have provided cutting point geometries which assure that the coolant physically reaches the most important thermal targets. Hence, it would be useful to provide an improved topography for cutting tool points which would channel coolant toward the higher thermal regions of the cutting edge of the tool, would create currents which dissipate heat and reduce friction, and would compel flow channels which assist in the evacuation of work piece material.

DISCLOSURE OF THE INVENTION

With parenthetical reference to the corresponding parts, portions or surfaces of the disclosed embodiment, merely for the purposes of illustration and not by way of limitation, the present invention provides an improved cutting tool adapted to be moved relative to a work piece (38) and having a marginal end portion (15) adapted to selectively remove material from the work piece when the tool is moved relative to the work piece.

The improvement comprises a marginal end having a leading cutting lip (16), a trailing dam (18), a recessed surface (19) extending into the marginal end between the cutting lip and the dam, and a coolant hole (20) communicating with the recessed surface, such that the recessed surface forms a reservoir (40) for coolant (36).

The marginal end may also comprise a second cutting lip (25), a second dam (26), a second recessed surface (28) extending into the marginal end between the second cutting lip and the second dam, and a second coolant hole (29) communicating with the second recessed surface, such that the second recessed surface forms a reservoir for coolant.

The present invention also discloses a cutting tool adapted to be moved relative to a work piece and having a marginal end portion adapted to selectively remove material from the work piece when the tool is moved relative to the work piece, the marginal end portion having an axis of rotation (42) and at least one flute (21). The improvement comprises at least one chip-forming notch (31) extending from the flute into the marginal end portion and beyond the axis of rotation.

The present invention also discloses a cutting tool adapted to be moved relative to a work piece and having a marginal end portion adapted to selectively remove material from the work piece when the tool is moved relative to the work piece, the marginal end portion having an axis of rotation and a chip former (37), the improvement comprising a chip breaker (32).

The present invention also discloses a cutting tool adapted to be moved relative to a work piece and having a marginal end portion adapted to selectively remove material from the work piece when the tool is moved relative to the work piece. The improvement comprises a leading cutting lip, a trailing dam, a recessed surface extending into the marginal end between the cutting lip and the dam, a coolant hole communicating with the recessed surface, and a land (22) having an upper portion (33) and a lower portion (34), the upper portion having a land recess (35) to accommodate coolant and to provide a fluid bearing between the upper portion and the work piece.

Accordingly, the general object of the present invention is to provide a cutting tool with an improved structure which results in a more durable, longer lasting, and less maintenance intensive cutting tool which provides a more precise cut.

Another object is to provide a cutting tool with an improved topography which better dissipates heat from the cutting action.

Another object is to provide a cutting tool with an improved topography which minimalizes frictional contact between the cutting tool and the work piece.

Another object is to provide a cutting tool with an improved topography which forms a hydraulic reservoir of coolant between the surfaces of the cutting tool and the work piece.

Another object is to provide a cutting tool with an improved topography such that coolant is forced in the direction of rotation so as to cool the leading cutting lip.

Another object is to provide a cutting tool with an improved topography such that coolant is forced towards the axis of rotation so as to assist in chip-breaking and removal of work piece material.

Another object is to provide a cutting tool having an improved chip-forming notch such that work piece material more easily exits through the flutes of the tool.

Another object is to provide a cutting tool having a chip breaker for breaking the material removed from the work piece into pieces for additional ease of expulsion through the flutes of the tool and to reduce heat.

Another object is to provide a cutting tool with an improved topography and a land recess such that coolant is forced between the recessed portion of the lands and the work piece so as to provide a hydraulic fluid bearing.

Another object is to provide a cutting tool with a fluid bearing which assists in centering the cutting tool for more precise cutting.

Another object is to provide a cutting tool with a fluid bearing which reduces friction between the cutting tool and the work piece.

These and other objects and advantages will become apparent from the foregoing and ongoing written specifications, the drawings, and the appended claims.

BRIEF DESCRIPTION OF THE DRAWINGS

FIG. 4 is a schematic of a cutting tool known in the prior art, showing the path of the coolant during the cutting operation.

FIG. 5 is a bottom plan view of a cutting tool shown in FIG. 4, showing the path of coolant during the cutting operation.

FIG. 6 is a schematic of the improved cutting tool, showing the improved path of coolant during the cutting operation.

FIG. 7 is a bottom plan view of the improved cutting point tool shown in FIG. 6, showing the improved path of coolant during the cutting operation.

FIG. 8 is a top plan view of the marginal end portion shown in FIG. 1, showing the chip-forming notch.

FIG. 9 is a top plan view of the marginal end portion shown in FIG. 10, showing the chip former and the chip breaker.

FIG. 10 is a perspective view of the marginal end portion, showing the chip former and chip breaker.

FIG. 11 is a fragmentary longitudinal vertical sectional view of the marginal end portion shown in FIG. 10, taken generally on line 11—11 of FIG. 10.

DESCRIPTION OF THE PREFERRED EMBODIMENTS

At the outset, it should be clearly understood that like referenced numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangements of parts, proportion, degree, etc.) together with the specification, and are to considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" generally refer to the orientation of the surface relative to its axis of elongation, or axis of rotation, as appropriate.

Figure 1:
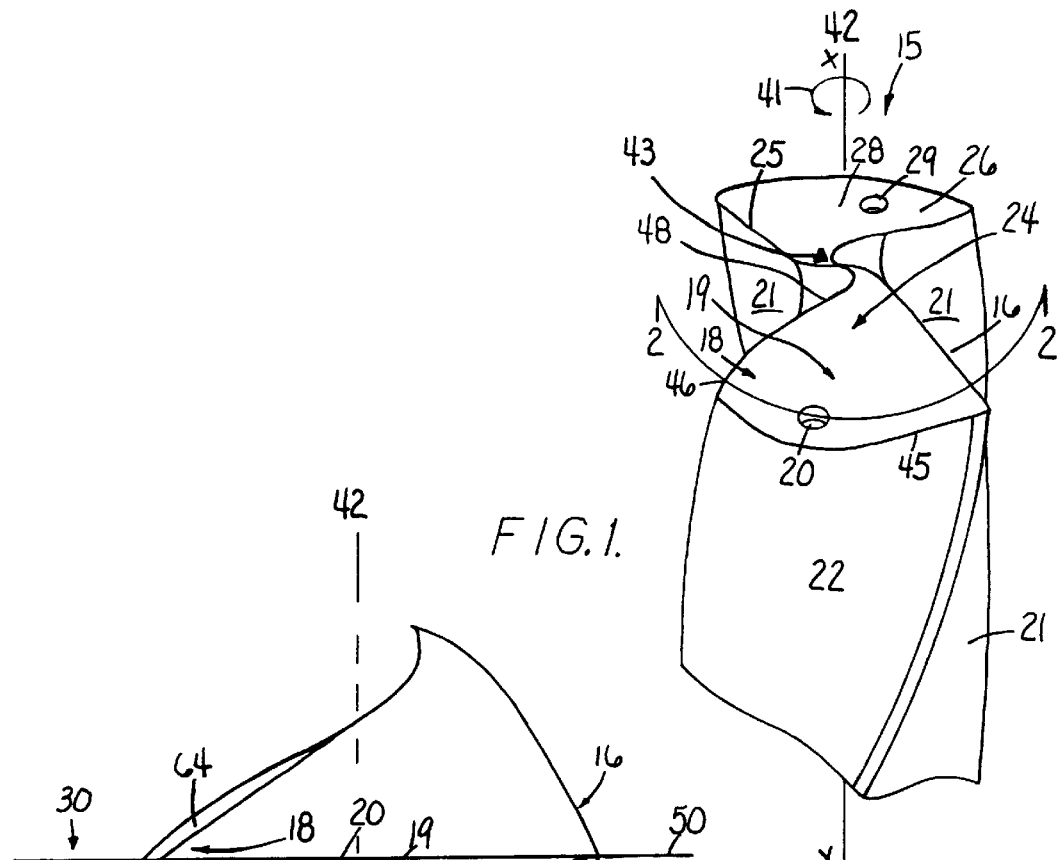
FIG. 1 is a perspective view of the marginal end portion of the improved cutting tool.

Referring now to the drawings and, more particularly, to FIG. 1 thereof, this invention provides an improved cutting tool that is adapted to be moved relative to a work piece and that has a marginal end portion adapted to selectively remove material from the work piece when the tool is moved relative to the work piece. The presently preferred embodiment is generally indicated at 15. Marginal end 15 generally consists of a substantially cylindrical member elongated along axis x—x. Marginal end 15 of the cutting tool is shown as having an axis of rotation 42 and is rotatable in a counterclockwise direction as indicated by arrow 41. Two helical flutes 21 are cut into marginal end 15 to assist in the removal of work piece material 39. Lands 22 are positioned between flutes 21 and consist of the peripheral portion of marginal end 15. The top surface of marginal end portion 15 is defined by the top of lands 22 and web 43. Heel 24 is defined by the top surface of land 22 and is generally bound by cutting lip 16, land edge 45, and flute edge 46. The topography of heel 24 is defined by leading cutting lip 16, trailing dam 18, and recessed surface 19. Recessed surface 19 dips into heel 24 between leading cutting lip 16 and trailing dam 18. Coolant hole 20 communicates with recessed surface 19.

Figure 2:
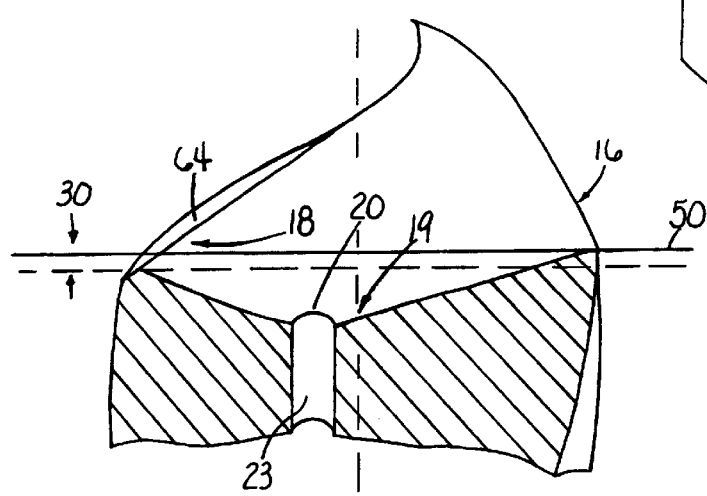
FIG. 2 is an longitudinal vertical sectional view of the marginal end portion shown in FIG. 1, taken generally on line 2—2 of FIG. 1. The curvature of surface 24 has been accentuated for illustrative purposes.
Figure 3:
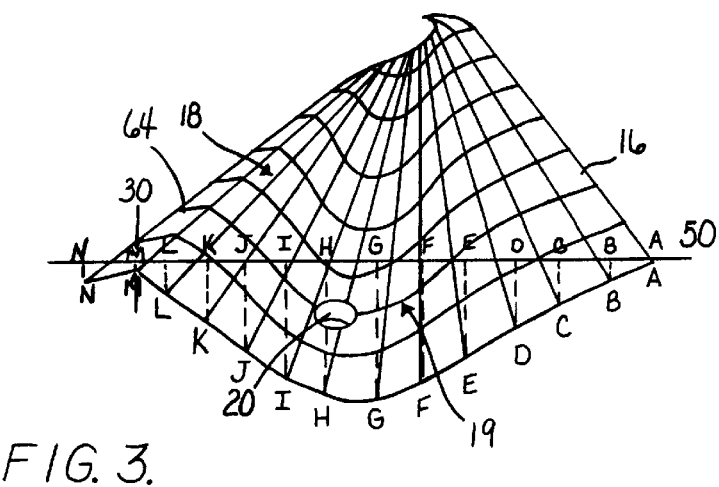
FIG. 3 is a perspective view of surface 24 of FIG. 1. Contour lines have been added and accentuated to show the topography of surface 24 for illustrative purposes.

As best shown in FIGS. 2–3, heel 24 is generally recessed. FIG. 2 shows the recessed curvature of heel 24 taken on line 2—2 of FIG. 1. In the preferred embodiment, recessed surface 19 is convex from cutting lip 16 to the full depth of the recess (approximately at the location of coolant hole 20) and concave from the full depth of the recess to the top of trailing dam 18. Clearance 30 is defined by a line drawn from a radial point on leading cutting lip 16 and perpendicular to axis of rotation 42, and a line drawn from the same radial point on trailing dam 18 and perpendicular to axis of rotation 42. Clearance 30 at positions along the top of trailing dam 18 are such that trailing dam 18 will not substantially rub or cut work piece 38 when the tool is in operation. FIG. 2 also shows coolant hole 20 communicating with recessed surface 19 in the general location at which recessed surface 19 has the greatest clearance. FIG. 2 also shows dam relief 64. Trailing dam 18 is relieved to avoid possible rubbing.

FIG. 3 shows heel 24 with topographical lines showing the contours of the surface. The depth of recessed surface 19 has been exaggerated in FIGS. 2 and 3 for illustrative purposes. The actual distances between perpendicular line 50 and points along recessed surface 19 at equal radial distances are measured in fractions of inches. For example, at points along land edge 45: A—A=0.0000 in., B—B= 0.0040 in., C—C=0.0080 in., D—D=0.0120 in., E—E= 0.0160 in., F—F=0.0200 in., G—G=0.0240 in., H—H= 0.0230 in., I—I=0.0215 in., J—J=0.0185 in., K—K=0.0120 in., L—L=0.0048 in., M—M (or clearance 30)=0.0025 in., and N—N=0.0090 in. These dimensions may be modified.

As shown in FIG. 3, leading cutting lip 16 forms a sharp ridge running radially along the right side of heel 24. Trailing dam 18 forms a ridge running radially along the left side of heel 24. Therebetween, recessed surface 19 forms a valley running radially between the left and right ridges of trailing dam 18 and leading cutting lip 16. Coolant hole 20 communicates with recessed surface 19.

FIGS. 4–5 show cutting tools already known in the prior art. In FIG. 4, the cutting tool is depicted in the process of removing material from work piece 38. Coolant 36 is forced down through coolant channel 23, exiting at coolant hole 20. In the prior art, coolant 36 exits coolant hole 20 and moves opposite the direct of rotation 41 and away from leading cutting lip 16. FIG. 5 shows a bottom plan view of the cutting tool shown in FIG. 4. Coolant 36 exits coolant hole 20 and moves opposite to the direction of rotation 41.

Consequently, coolant 36 does not reach leading cutting lip 16. Instead, tools known in the prior art are designed such that coolant 36 will be expelled into the trailing flute, where it will contact and cool second cutting lip 25.

FIGS. 6–7 show the improved cutting tool with the new topography. As shown in FIG. 6, coolant 36 exits from coolant hole 20. However, unlike the prior art, the improved structure has a topographical relief defined by trailing dam 18, leading cutting lip 16, and recessed surface 19. As a result of this topography, coolant 36 exits from coolant hole 20 and is pressured to move in the direction of rotation 41 and towards cutting lip 16. This hydraulic pressure provides greater cooling action to the key thermal regions and reduces friction.

FIG. 7 is a bottom plan view of the improved cutting tool shown in FIG. 6. FIG. 7 shows trailing dam 18, leading cutting lip 16 and recessed surface 19. In operation, recessed surface 19 fills with coolant 36 and forms reservoir 40. Reservoir 40 acts as a pressurized chamber bounded by leading cutting lip 16, trailing dam 18, recessed surface 19, and the uncut surfaces of work piece 38. As shown in FIG. 7, coolant 36 exits coolant hole 20 and is forced by trailing dam 18 and dynamically applied external pressure to move in the direction of rotation 41 to cool leading cutting lip 16. With this topography, the pressure is such that coolant 36 will exit reservoir 40 through chip-forming notch 31. Accordingly, coolant 36 cools and reduces friction on web 43 as well as leading cutting lip 16. In addition, the expulsion of coolant 36 through chip-forming notch 31 assists in breaking the work material as it is cut, and assists in dissipating chips 39 and associated heat out through flutes 21.

FIG. 8 is a top plan view of the marginal end portion shown in FIG. 1. As shown in FIG. 8, web 43 has chip-forming notches 31 cut into it. Chip-forming notches 31 extend from respective flutes 21 into web 43 to points beyond axis of rotation 42.

FIG. 10 is a perspective view of the marginal end portion showing the chip former and chip breaker. FIG. 9 is a top plan view of the marginal end portion shown in FIG. 10. As shown in FIGS. 9–10, web 43 has chip former 37 and chip breaker 32 cut into it. Chip former 37 may be similar to chip-forming notch 31, as shown in FIG. 8, which extends beyond axis of rotation 42, or it may be other chip-forming notches known in the prior art which do not extend beyond axis of rotation 42. Chip breaker 32 is cut into chip former 37 of marginal end portion 15 at a parallel distance 56 from a line 51 drawn approximately tangential to the radial intersection 55 of web 43 and leading cutting lip 16. As an example, the distance 56 from tangent line 51 to the top of chip breaker 32 is approximately 0.02 inches.

FIG. 11 is a fragmentary vertical sectional view of chip former 37 and chip breaker 32 shown in FIG. 10, taken generally on line 11—11 of FIG. 10. As shown, chip breaker 32 is cut into the surface of chip former 37 at a distance 56 from intersection 55. Chip breaker 32 acts to tear or split work piece 38 material into two chips. This chip breakage allows for cooler machining and easier evacuation of work piece material.

Figure 12:
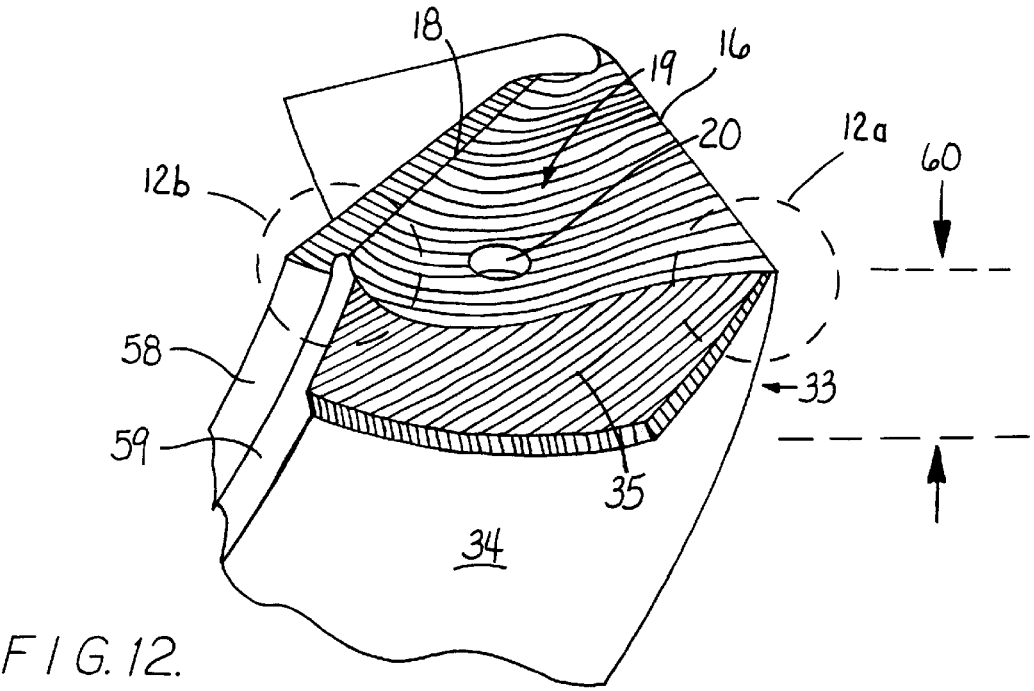
FIG. 12 is a perspective view of the marginal end portion of the improved tool, showing the upper and lower portions of the land and the land recess.

FIG. 12 is a perspective view of the marginal end portion of the improved tool. In FIG. 12, marginal end portion 15 includes upper portion 33 of land 22 and lower portion 34 of land 22. Upper portion 33 of land 22 is cut to form land recess 35. The outer radius of land recess 35 is less than the outer radius of land 22. Land recess 35 extends longitudinally down marginal end 15 a land recess length 60.

FIG. 12 also shows the preferred embodiment including a secondary flute 59. Secondary flute 59 is smaller than flute 21. Secondary flute 59 extends from the outer radial edge of trailing dam 18 down the length of marginal end portion 15 and generally parallel to helical flute 21. Flute 21 and secondary flute 59 define a secondary land 58.

Figure 12A:
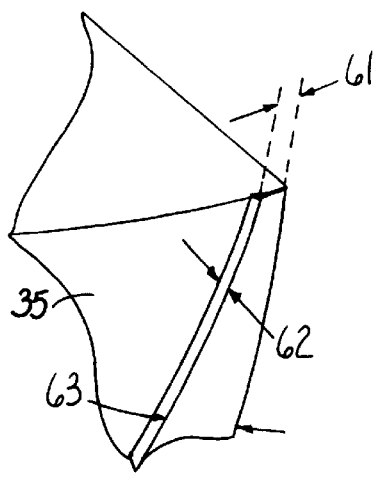
FIG. 12a is an enlarged fragmentary perspective view of the indicated circle in FIG. 12.

FIG. 12a shows the orientation of the right outside radial corner of marginal end portion 15. As shown in FIG. 12a, upper portion 33 of land 22 has a leading land width 61 which increases as the land recess length increases. That is, land recess 35 is cut into end portion 15 with a leading land angle 63.

Figure 12B:
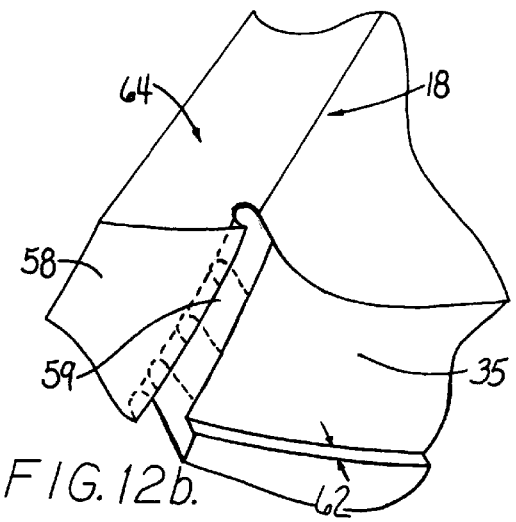
FIG. 12b is an enlarged fragmentary perspective view of the indicated circle in FIG. 12.

FIG. 12b shows the left outside radial corner of land 22. As shown in FIG. 12b, land recess 35 has a land recess depth 62. FIG. 12b also shows secondary land 58 and secondary flute 59. Secondary land 58 may be radially relieved and is axially relieved.

Figure 13:
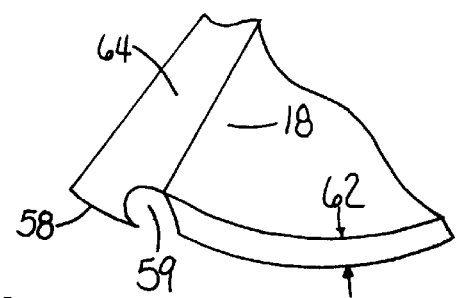
FIG. 13 is top plan view of the structure shown in FIG. 12b.

FIG. 13 is a plan view of the structure shown in FIG. 12b, showing land recess depth 62, secondary land 58, secondary flute 59, and dam relief 64. Under the influence of the hydraulic action created by the improved topography and injected coolant, a fluid bearing is created between the land recess 35 surfaces and the uncut portion of work piece 38. This hydraulic bearing helps center the cutting tool and reduce friction.

Marginal end portion 15 is constructed of high speed steel alloys, such as high carbon steel with given percentages of chromium, cobalt, nickel, or tungsten.

Modifications

The present invention contemplates that many changes and modifications may be made. The particular materials of which the various body parts and component parts are formed are not deemed critical and may be readily varied. Although high speed steel alloys have been cited as the preferred material of construction for the cutting tool, other steel alloys or other metals, carbides, ceramics, plastics, composites, resins, or natural or synthetic crystalline structures may be substituted therefore. In addition, various coatings may or may not be employed. Similarly, the particular shape of the cutting tool may be altered, modified or varied by a skilled designer. In this regard, the dimensions of the flutes and lands may be varied. Similarly, the curvature of the heel may be varied. The dam may have a clearance greater or less than the preferred embodiment. In addition, the recessed surface may have a slope greater or less than the preferred embodiment and a curvature different from the concave/convex configuration of the preferred embodiment. In addition, the coolant hole may exit at different points on the recessed surface, including at points closer to the cutting lip, points closer to the trailing dam, or at points closer or further away from the axis of rotation, or any combination of the above.

Not only may the dimensions of the preferred embodiment be altered, but the topography claimed may be applied to other types of cutting tools besides drilling tools. These other tools may include non-drill type cutting devices, such as a single point cutting tool, and stationary cutting devices.

Not only may various fluids, such as water or oil, be used as coolant, but gaseous coolants, gels, air, or any combination of the above, may be used as coolant.

Therefore, while the presently-preferred form of the cutting tool has been shown and described, and several modifications thereof discussed, persons skilled in this art will readily appreciate that various additional changes and modifications may be made without departing from the spirit of the invention, as defined and differentiated by the following claims.

What is claimed is:

1. A cutting tool adapted to be moved relative to a work piece and having a marginal end portion adapted to selectively remove material from said work piece when said tool is moved relative to said work piece, said marginal end portion comprising:

a leading cutting lip;

a trailing dam;

a recessed surface extending into said marginal end between said cutting lip and said dam; and a coolant hole communicating with said recessed surface;

such that said recessed surface forms a reservoir for coolant.

2. The cutting tool as set forth in claim 1, and further comprising:

a second cutting lip;

a second dam;

a second recessed surface extending into said marginal end between said second cutting lip and said second dam; and a second coolant hole communicating with said second recessed surface, such that said second recessed surface forms a second reservoir for coolant.

3. In a cylindrical cutting tool adapted to be moved relative to a work piece and having a marginal end portion adapted to selectively remove material from said work piece when said tool is moved relative to said work piece, the improvement comprising:

a leading cutting lip;

a trailing dam;

a recessed surface extending into said marginal end between said cutting lip and said dam;

a coolant hole communicating with said recessed surface;

a land having an upper portion and a lower portion;

said upper portion having a land recess to accommodate coolant and to provide a fluid bearing between said upper portion and said work piece.

* * * * *